United States Patent [19]

Houng

[11] Patent Number: 4,554,993
[45] Date of Patent: Nov. 26, 1985

[54] INFLIGHT HEADSET FOR CIVIL AIRCRAFT

[76] Inventor: Huang-Kiang Houng, No. 138, Chung-Hsing St., Kaohsiung City, Taiwan

[21] Appl. No.: 629,603

[22] Filed: Jul. 11, 1984

Related U.S. Application Data

[63] Continuation-in-part of Ser. No. 544,267, Oct. 21, 1983, Pat. No. 4,472,607.

[51] Int. Cl.$^4$ ............................................. H04M 1/05
[52] U.S. Cl. .................................. 181/130; 181/135; 179/156 R
[58] Field of Search .......... 179/156 R, 156 A, 182 A, 179/182 R, 178; 2/209; 181/129, 130, 135

[56] References Cited

U.S. PATENT DOCUMENTS 1,587,409  6/1926  Ouillette .......................... 179/156 R
4,472,607  9/1984  Houng ............................. 179/182 A Primary Examiner—Gene Z. Rubinson
Assistant Examiner—Danita R. Byrd

[57] ABSTRACT

The present invention relates to an inflight headset for civil aircraft and in particular to one comprising a pair of main body portions each having a cylindrical member formed integrally therewith, a pair of covers each connected to one of the main body portions, a headband each end of which is provided with a collar having a protuberance at its lower end, a pair of ear cushions each connected to one of the main body portions, and a pair of acoustic pipes each connected to one of the main body portions.

3 Claims, 9 Drawing Figures

INFLIGHT HEADSET FOR CIVIL AIRCRAFT

CROSS-REFERENCE TO A RELATION APPLICATION

This is a continuation-in-part of the application Ser. No. 544,267 filed Oct. 21, 1983, now U.S. Pat. No. 4,472,607.

BACKGROUND OF THE INVENTION

Headsets of the type referred to are well known in the prior art; nevertheless, the prior art inflight headsets for civil aircraft have the following drawbacks:

1. The ear cushions can be adjusted in height but cannot be rotated with respect to the perpendicular plane along the length of the headband. Since the ears of users are positioned differently, the headphones cannot satisfactorily adapt to the needs of everbody.

2. Each earpiece of the headphones, which is made of flexible plastics, is in the shape of a mushroom. Each of the earpieces is inserted into the auditory canal in the ear of a user so that the user will certainly feel uncomfortable after having worn the earpiece for a short time.

3. The sound wave must make an abrupt turn before entering into the ear cushions, thus resulting in much distortion.

SUMMARY OF THE INVENTION

It is a primary object of the present invention to provide an inflight headset for civil aircraft of which the ear cushion may be rotated with respect to a perpendicular plane along the headband.

It is another object of the present invention to provide an inflight headset for civil aircraft which may faithfully transmit music or the like.

It is still another object of the present invention to provide an inflight headset for civil aircraft which is simple in construction.

It is still another object of the present invention to provide an inflight headset for civil aircraft which is easy to assemble.

It is a further object of the present invention to provide an inflight headset for civil aircraft which is economic to produce.

Other objects and advantages of the present invention will be evident from the following detailed description when read in conjunction with the accompanying drawings which illustrate a preferred embodiment of the invention.

DETAILED DESCRIPTION OF THE PREFERRED EMBODIMENT

Figures 1A, 1B:
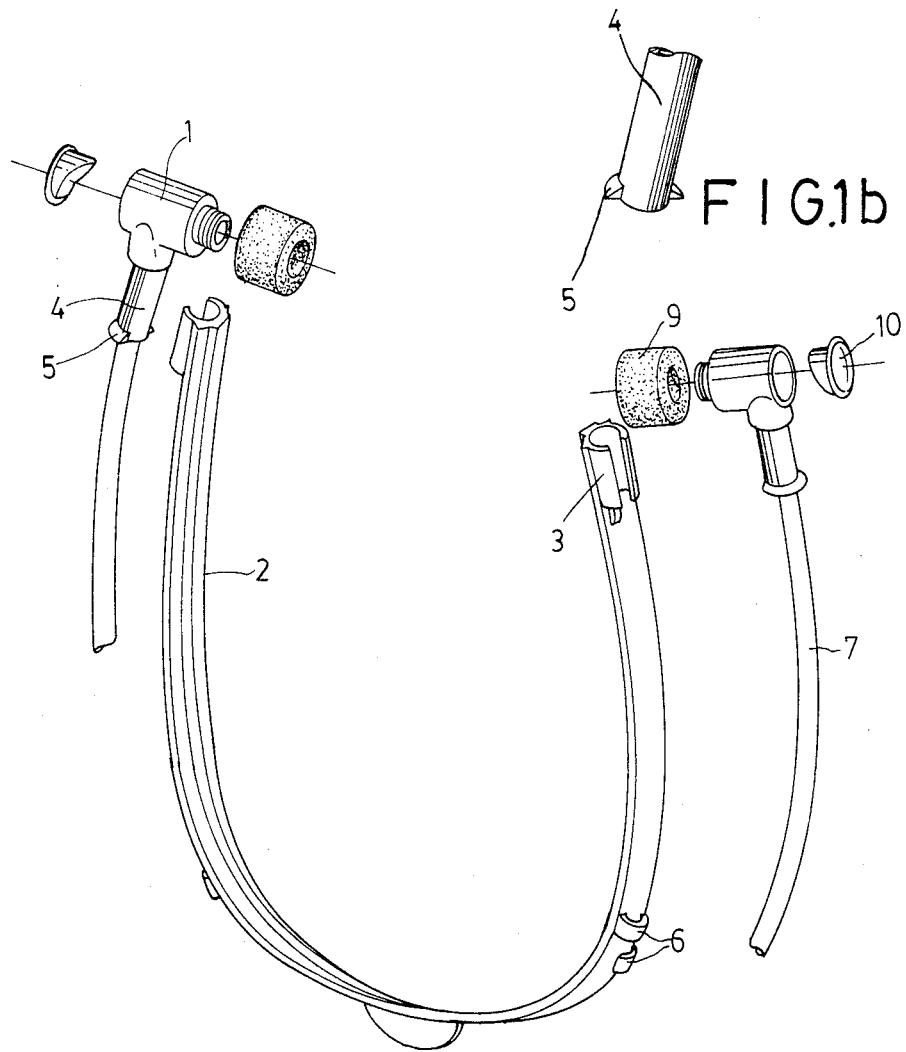
FIG. 1a is an exploded view of an inflight headset for civil aircraft according to a preferred embodiment of the present invention.
FIG. 1b shows the protuberance at the end of cylindrical member 4.
Figure 2:
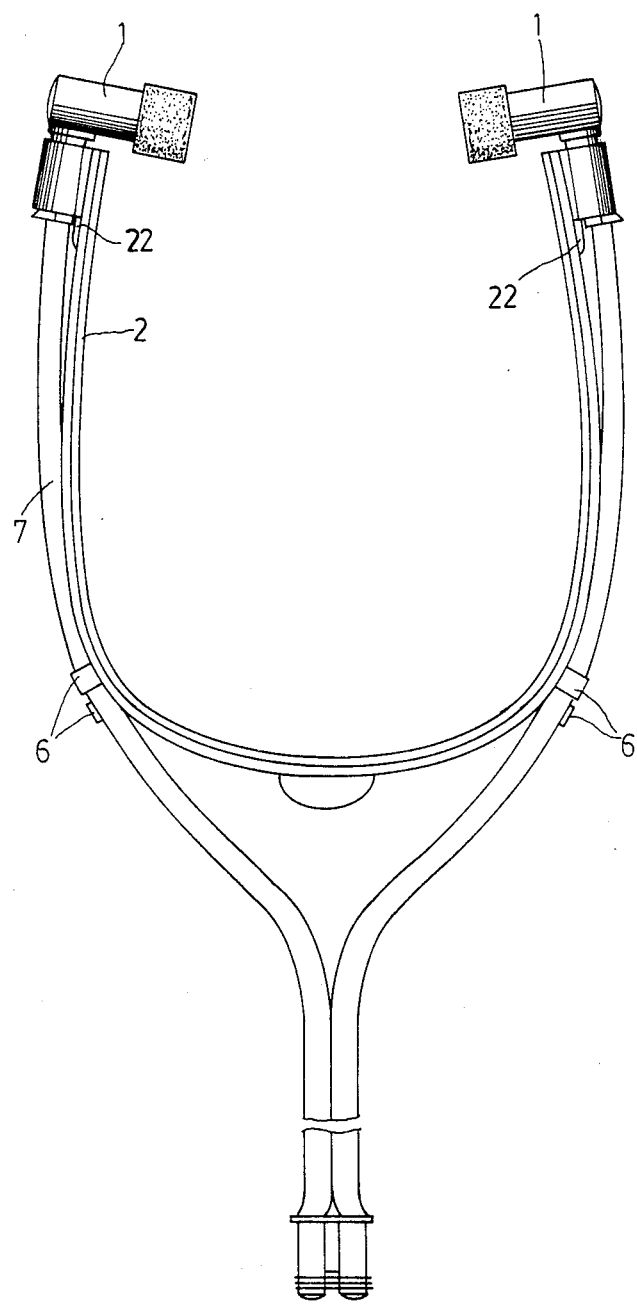
FIG. 2 is a front view of the inflight headset.
Figure 3:
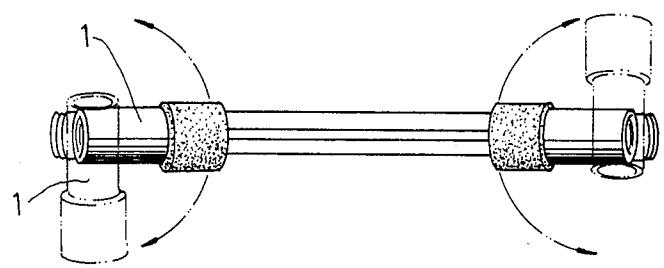
FIG. 3 is a top view of the inflight headset as shown in FIG. 2.
Figure 4C:
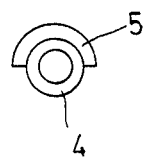
FIGS. 4a, 4b and 4c show three views of the cylindrical member of the inflight headset.
Figures 4A, 4B:
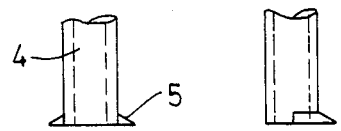
Figure 6:
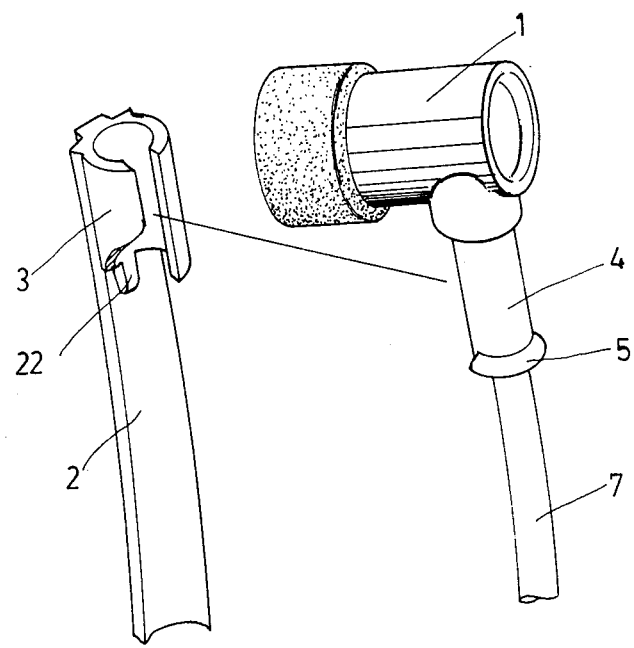
FIG. 6 shows, on an enlarged scale, the cylindrical member and the main body portion of the inflight headset.

Referring to the drawings and in particular to FIG. 1 thereof, the inflight headset for civil aircraft according to the present invention comprises a headband (2), a pair of main body portions (1), a pair of ear cushions (9), a pair of covers (10), and a pair of acoustic pipes (7). Each end of the headband (2) has a collar (3) formed integrally therewith. The collar (3) is made of elastic material so that it may go back to its previous shape after peing pulled. As illustrated in FIG. 6, the collar (3) comes with a protuberance (22) at its lower end. On the lower part of the main body portion (1) is a cylindrical member (4) having a semi-circular protuberance (5) at its free end. Each of the main body portion (1) is connected to a corresponding collar (3), with the cylindrical member (4) fitted therein. Accordingly, the main body portion (1) may be rotated through an angle of 90° with respect to the perpendicular plane along the length of the headband (2), as shown in FIG. 3. Further, two retaining members (6) are provided on both sides of the headband (6) for keeping the acoustic pipes (7) in place.

Figure 5:
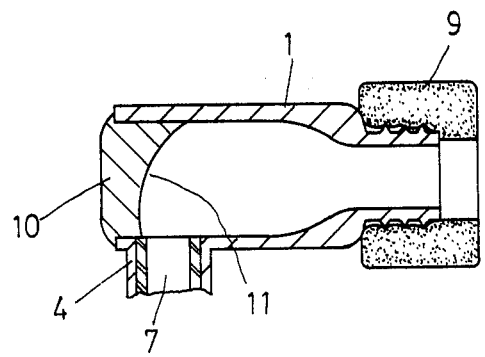
FIG. 5 is a cross-sectional view of the earpiece of the inflight headset.

With reference to FIGS. 1 and 5, the outer side of the main body portion (1) is engaged with cover (10) having a smoothly curved inner surface (11). Hence, the main body portion (1) cooperates with the cover (2) to form a very smooth passage, thereby faithfully transmitting the music or the like. Furthermore, the cover (2) is pushed to be directly connected to the main body portion (1) and this will facilitate the assembly and manufacture of the headset.

While various changes and modifications might be proposed by those skilled in the art, it will be understood that I wish to include within the claims of the patent warranted hereon all such changes and modifications as reasonably come within my contribution to the art.

I claim:

1. An inflight headset for civil aircraft comprising:
   a pair of main body portions each having a cylindrical member formed integrally therewith,
   said cylindrical member having one end connected to said body portion and the other end being provided with a semi-circular protuberance;
   a pair of covers each connected to one of said main body portions;
   a headband each end of which is provided with a collar having a protuberance at one end thereof, said cylindrical member of said main body portion being fitted in said collar in such a way that the protuberance of said collar in association with the semi-circular protuberance of said cylindrical member enables said main body portion to rotate through 90° with respect to a plane perpendicular to the length of said headband;
   a pair of ear cushions each connected with one of said main body portions; and
   a pair of acoustic pipes each connected to one of said main body portions.

2. An inflight headset for civil aircraft as claimed in claim 1, wherein said collars are made of an elastic material.

3. An inflight headset for civil aircraft as claimed in claim 1, wherein each said cover has a smoothly curved inner surface so that a very smooth passage is formed when said cover is engaged with said main body portion.

* * * * *